United States Patent
Kikin-Gil et al.

(10) Patent No.: US 11,410,426 B2
(45) Date of Patent: Aug. 9, 2022

(54) CLASSIFICATION OF AUDITORY AND VISUAL MEETING DATA TO INFER IMPORTANCE OF USER UTTERANCES

(71) Applicant: Microsoft Technology Licensing, LLC, Redmond, WA (US)

(72) Inventors: Erez Kikin-Gil, Bellevue, WA (US); Daniel Yancy Parish, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 252 days.

(21) Appl. No.: 16/892,635

(22) Filed: Jun. 4, 2020

(65) Prior Publication Data

US 2021/0383127 A1    Dec. 9, 2021

(51) Int. Cl.
| | |
|---|---|
| *G06K 9/00* | (2022.01) |
| *G06V 20/40* | (2022.01) |
| *G06K 9/62* | (2022.01) |
| *G06N 3/04* | (2006.01) |
| *G06N 3/08* | (2006.01) |
| *G10L 17/00* | (2013.01) |
| *G10L 17/18* | (2013.01) |

(Continued)

(52) U.S. Cl.
CPC .......... *G06V 20/47* (2022.01); *G06K 9/6256* (2013.01); *G06N 3/0445* (2013.01); *G06N 3/08* (2013.01); *G06V 20/41* (2022.01); *G06V 40/16* (2022.01); *G10L 17/00* (2013.01); *G10L 17/18* (2013.01); *H04N 7/155* (2013.01)

(58) Field of Classification Search
CPC ........ G06V 20/47; G06V 20/41; G06V 40/16; G06V 2201/10; G06V 10/82; G06V 40/172; G06K 9/6256; G06K 9/6293; G06N 3/0445; G06N 3/08; G10L 17/00; G10L 17/18; G10L 15/16; G10L 15/26; G10L 25/54; H04N 7/155; G06F 16/345
USPC ................ 382/118; 704/235, 15.045, 15.043
See application file for complete search history.

(56) References Cited

U.S. PATENT DOCUMENTS 7,962,525 B2    6/2011   Kansal
10,860,985 B2*  12/2020  Nelson ................... G06Q 10/10
(Continued)

OTHER PUBLICATIONS

Erol, et al., "Multimodal Summarization of Meeting Recordings", In Proceedings of the International Conference on Multimedia and Expo, Jul. 6, 2003, 4 Pages.

(Continued)

*Primary Examiner* — Charlotte M Baker

(57) ABSTRACT

In non-limiting examples of the present disclosure, systems, methods and devices for generating summary content are presented. Voice audio data and video data for an electronic meeting may be received. A language processing model may be applied to a transcript of the audio data and textual importance scores may be calculated. A video/image model may be applied to the video data and visual importance scores may be calculated. A combined importance score may be calculated for sections of the electronic meeting based on the textual importance scores and the visual importance scores. A meeting summary that includes summary content from sections for which combined importance scores exceed a threshold value may be generated.

20 Claims, 13 Drawing Sheets

(51) Int. Cl.
*H04N 7/15* (2006.01)
*G06V 40/16* (2022.01)

(56) References Cited

U.S. PATENT DOCUMENTS

| | | | | |
|---|---|---|---|---|
| 2008/0300872 | A1* | 12/2008 | Basu | G06F 16/7844 |
| | | | | 704/235 |
| 2019/0349212 | A1* | 11/2019 | Heins | H04L 12/1831 |
| 2020/0258525 | A1* | 8/2020 | Mcquiston | G06Q 10/1095 |
| 2020/0372066 | A1* | 11/2020 | Saggi | G06F 16/45 |
| 2021/0011961 | A1* | 1/2021 | Guan | G06F 3/04842 |

OTHER PUBLICATIONS

Li, et al., "Read, Watch, Listen, and Summarize: Multi-Modal Summarization for Asynchronous Text, Image, Audio and Video", In Journal of IEEE Transactions on Knowledge and Data Engineering, vol. 31, Issue 5, May 1, 2019, pp. 996-1009.
"International Search Report and Written Opinion Issued in PCT Application No. PCT/US21/028278", dated Jul. 16, 2021, 9 Pages.

* cited by examiner

CLASSIFICATION OF AUDITORY AND VISUAL MEETING DATA TO INFER IMPORTANCE OF USER UTTERANCES

BACKGROUND

Organizations and the population at large are increasingly relying on electronic meeting applications where users meet electronically with audio and/or video connections. Participants of electronic meetings, as well as users that were unable to attend those meetings, often turn to meeting recordings and transcriptions to refresh their recollection of what occurred or to catch up on what they missed. However, this can be time consuming and difficult because the vast majority of recorded content is of low importance to users. Additionally, while some utterances may be of value to certain groups of users, those utterances may be of little, if any, value to other groups of users.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for generating summary content of electronic meetings. Audio of an electronic meeting may be transcribed. One or more language machine learning models may be applied to the transcription to identify key points, relevant documents, and/or tasks that are assigned during the electronic meeting. The one or more language machine learning models may assign a language importance score to one or more sections of an electronic meeting. The one or more language machine learning models may comprise neural networks, embedding models, and/or keyword and phrase matching models. One or more visual machine learning models may be applied to the video of the electronic meetings. For example, a neural network that has been trained to classify facial expressions and/or user mannerisms into emotional and/or interest categories may receive and process the video data for the electronic meeting. A visual importance score may be assigned to one or more sections of the electronic meeting based on the classification by the neural network of video of participants of the electronic meeting.

A combined importance score may be determined for one or more sections of an electronic meeting based on corresponding textual and visual importance scores. The combined importance score may additionally take into account the position of meeting participants in an organizational hierarchy. If a section of an electronic meeting is determined to have a combined importance score above a threshold value, a meeting summary that includes summary content for that section may be generated. The summary content may be included in a video summary, a document summary, and/or an electronic message summary A meeting summary may include tasks that were assigned during an electronic meeting, key points that were discussed during an electronic meeting, documents that were mentioned during an electronic meeting, and/or active participants of an electronic meeting.

BRIEF DESCRIPTION OF THE DRAWINGS

Non-limiting and non-exhaustive examples are described with reference to the following figures.

DETAILED DESCRIPTION

Figure 1:
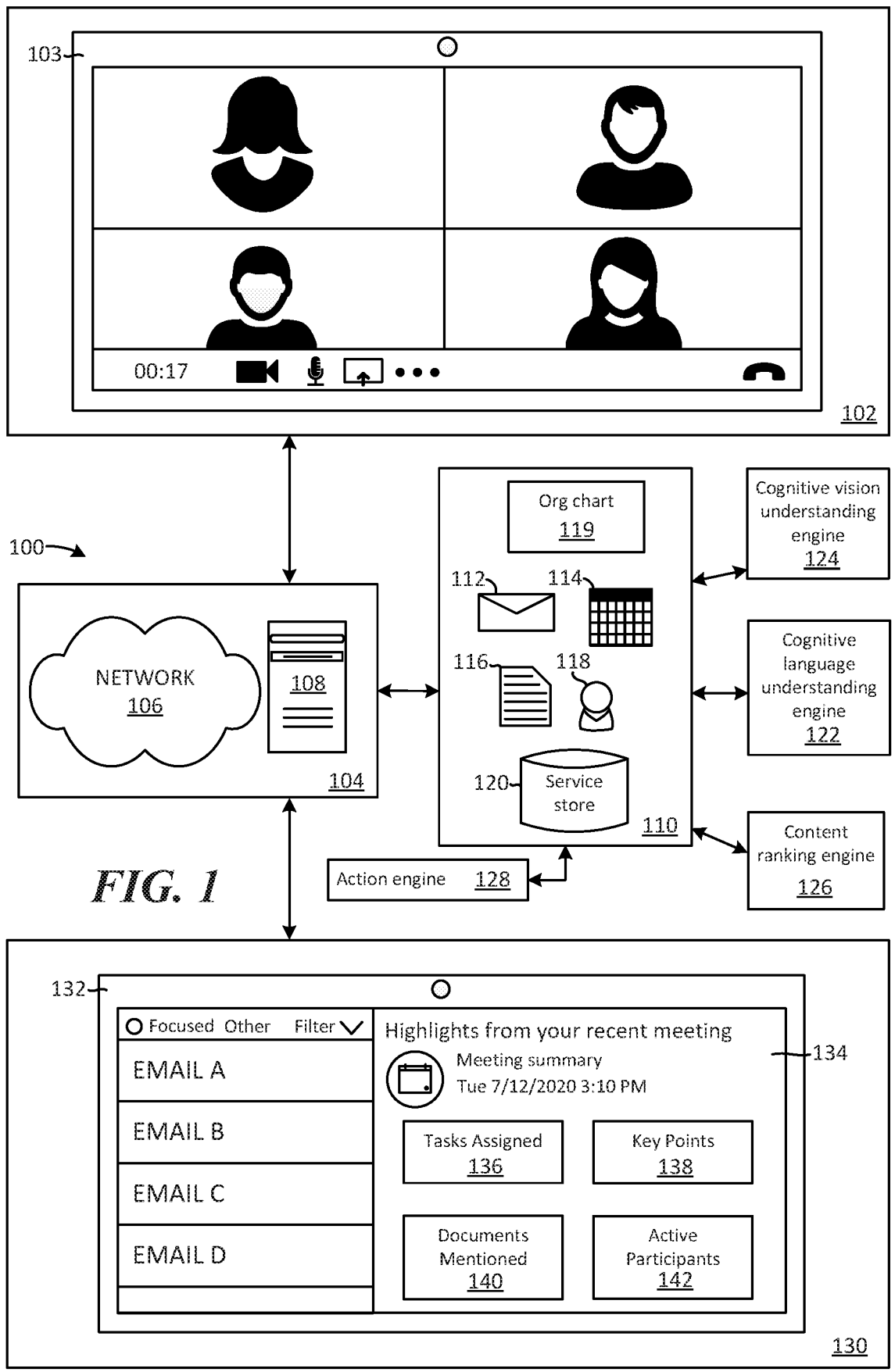
FIG. 1 is a schematic diagram illustrating an example distributed computing environment for generating summary content from electronic meetings.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Non-limiting examples of the present disclosure describe systems, methods and devices for identifying relevant information from electronic meetings and generating summary content from that relevant information. As described herein, relevant information comprises information that is important to one or more users. Thus, information that is relevant to one user, or one group of users, may not be relevant to another user, or another group of users. An electronic meeting summarization service may receive electronic meeting data for electronic meetings. The electronic meeting data may include voice audio data from each participant of an electronic meeting that had her audio/microphone on. The electronic meeting data may further include video data for each participant of an electronic meeting that had her video/camera on. The electronic meeting summarization service may identify important content, including key points, assigned tasks, documents mentioned, and active participants, from the electronic meeting data, and generate meeting summaries based on that identification.

The electronic meeting summarization service may apply a speech to text engine to the audio data for an electronic meeting and generate a transcript. One or more language processing models may then be applied to the transcript to identify important sections of the transcript. The importance may be in relation to the users that joined the meeting (e.g., the participants), to organizational groups of users that joined the meeting (e.g., engineer participants, human resources participants, legal participants), and/or to individual users that joined the meeting. For example, a first section of a meeting may only be important to users associated with a legal group of an organization, and a second section of a meeting may only be important to users associated with a human resources group of an organization. As such, a first set of important sections may be identified for their relevance to a first one or more users, and a second set of important sections may be identified for their relevance to a second one or more users. The one or more language processing models that are applied to the transcript may include neural networks, textual embedding models, and/or keyword and phrase matching models. The electronic meeting summarization service may determine textual importance scores for a plurality of sections of an electronic meeting. Each section may be comprised of one or more utterances (e.g., words, phrases, sentences, strings, paragraphs, etc.). In additional examples, the sections may be temporal in nature. For example, the electronic meeting summarization service may determine textual importance scores for each minute or five minutes of an electronic meeting.

One or more image/video processing models may be applied to the video data for an electronic meeting. One or more of the image/video processing models may comprise a cognitive vision understanding machine learning model. The cognitive vision understanding machine learning model may comprise a neural network that has been trained to classify image and/or video data of facial features and/or user mannerisms into one or more categories. The one or more categories may include: expressing interest, expressing disinterest, expressing happiness, and/or expressing unhappiness, for example. The electronic meeting summarization service may determine visual importance scores for a plurality of sections of an electronic meeting. Each section may be comprised of one or more utterances. In additional examples, the sections may be temporal in nature. For example, the electronic summarization service may determine visual importance scores for each minute or five minutes of an electronic meeting. The visual importance scores may be calculated based on the categorical classifications of the users' expressions and/or mannerisms by the cognitive vision understanding machine learning model. The number, percentage, and/or ratio of users that are determined to express interest, disinterest, and/or other emotional classifications may also be taken into account when determining a visual importance score for a section of an electronic meeting.

The electronic meeting summarization service my determine a combined importance score for one or more sections of the electronic meeting. A combined importance score may be based on a textual importance score for a section and a visual importance score for that same section. In some examples, the textual importance score or the visual importance score may be weighted more than the other. In some examples, a user's position in an organizational hierarchy may be utilized to determine an importance of an utterance in an electronic meeting. For example, users that have higher up positions in an organizational hierarchy may have more weight assigned to their utterances than users with lower down positions. Thus, a user's hierarchical position in an organization may be utilized in determining a textual importance score for a section of an electronic meeting, a visual importance score for a section of an electronic meeting, and/or a combined importance score for a section of a meeting.

If a determination is made that a combined importance score for a section of an electronic meeting is above a threshold value, summary content for that section may be generated and included in an electronic meeting summary. In some examples, the summary content for a section of an electronic meeting may include relevant documents mentioned during that section, tasks assigned during that section, and/or key points discussed or otherwise referenced in that section. The summary content included in an electronic meeting summary may be surfaced in a displayable order based on the combined importance scores of each section. For example, sections that have higher combined importance scores may have corresponding summary content surfaced more prominently (e.g., above, highlighted, bolded) than summary content corresponding to sections that have lower combined importance scores.

An electronic meeting summary may be generated in the form of an electronic message. The electronic message may include summary content that includes an indication of tasks that have been assigned, an indication of tasks that have been moved to a different action phase, key points included in a meeting, documents mentioned during a meeting, and/or an indication of which participants were most active during an electronic meeting.

An electronic meeting summary be additionally or alternatively be generated in the form of a video. The video summary may have sections that were not determined to be important removed from it. In other examples, the video summary may have selectable elements for jumping to important sections of an electronic meeting, skipping sections of an electronic meeting, repeating sections of an electronic meeting, augmenting sections of an electronic meeting, and/or correcting sections of an electronic meeting.

An electronic meeting summary may be modified based on user feedback received via a video recording, including a video summary, an electronic meeting transcript, or an electronic message summary. For example, if users skip parts of a video recording of an electronic meeting, the combined importance score for those sections may be lowered. Similarly, if users scroll through a section of a meeting transcript quickly, the combined importance score for those sections may be lowered. Alternatively, if users select a link to a particular document that was mentioned in an electronic message summary, the combined importance score for that section/document may be increased. Other user feedback received via meeting recording, video summary, electronic meeting transcript, and/or electronic message summary may be utilized in generating new electronic meeting summaries and/or modifying existing electronic meeting summaries.

The systems, methods, and devices described herein provide technical advantages for generating electronic meeting summaries. Processing costs (e.g., CPU cycles) are reduced via the mechanisms described herein in that computing devices that play meeting recordings do not have to retrieve and play sections of audio and video that have no importance to users. Rather, users wishing to review electronic meetings are provided with condensed content that only includes relevant information. Additionally, memory costs associated with storing large media files may be reduced when meeting summaries are generated for electronic meetings. For example, video summaries may include only the sections of an electronic meeting that are identified as being of interest, while the other sections may be deleted. Additionally, meeting summaries are traditionally generated manually, and they therefore include the biases of the users that generated them. Alternatively, the meeting summaries that are generated via the mechanisms described herein are non-biased and may be tailored to individuals and/or groups of individuals.

FIG. 1 is a schematic diagram illustrating an example distributed computing environment 100 for generating summary content from electronic meetings. Computing environment 100 includes electronic meeting sub-environment 102, network and processing sub-environment 104, service store sub-environment 110, cognitive language understanding engine 122, cognitive vision understanding engine 124, content ranking engine 126, action engine 128, and electronic meeting summary sub-environment 130.

Network and processing sub-environment 104 includes network 106, by which any of the computing devices described herein may communicate with one another, and server computing device 108, which is exemplary of a cloud-computing device that may perform one or more operations described herein in relation to a cloud-based service (e.g., an electronic calendar application service, an email application service, a document application service, an electronic meeting summarization service etc.). Although an electronic meeting summarization service is primarily described herein as being a cloud-based service, one or more operations associated with that service may be performed locally (e.g., on computing device 103, on computing device 132).

Service store sub-environment 110 comprises service store 120, which contains information associated with a plurality of user accounts, including documents 116, user information 118, past, present, and future calendar events 114, meeting/event invitations 112 associated with past, present and future events, and organization hierarchy chart 119. Documents 116 may include productivity application documents that are stored locally to a local computing device such as computing device 102 and/or one or more remote storage locations. Documents 116 may comprise one or more documents of one or more document types, including one or more of: emails, saved instant messages, word processing documents, presentation documents, spreadsheet documents, note application documents, etc. User information 118 may include user preferences and baseline information related to user facial expressions, lexical and prosodic voice/language, and/or mannerisms. Organization hierarchy chart 119 may include information related to a plurality of users of an organization, including their titles and hierarchical roles in relation to one another in the organization. In some examples, organization hierarchy chart 119 may also include information related to users' expertise with subject matter of various types (e.g., engineering expertise, legal expertise, management expertise, human resources expertise). Server computing device 108 and an associated electronic meeting summarization service may communicate with service store 120 and obtain and analyze information included therein in performing one or more operations described herein.

The electronic meeting summarization service may receive electronic meeting data (e.g., video data from an electronic meeting, audio data from an electronic meeting) generate summaries of electronic meetings based on the processing of the electronic meeting data. The processing may comprise applying one or more machine learning models to the video data and/or audio data to identify important sections and/or content of an electronic meeting. The processing may further comprise keyword and/or phrase matching to identify important sections and/or content of an electronic meeting. In additional examples, the electronic meeting summarization service may identify documents that were mentioned and/or referenced in an electronic meeting and include those documents in an electronic meeting summary. The electronic meeting summarization service may additionally or alternatively identify one or more tasks that were assigned to users during an electronic meeting and include those tasks in an electronic meeting summary. In some examples, the electronic meeting summarization service may determine that one or more projects and/or tasks have been moved from one phase of completion to a next phase of completion during an electronic meeting.

In this example, computing device 103 displays an electronic meeting application with an electronic meeting that is currently in progress. The electronic meeting has four active participants, with video of each of the four participants being displayed in a separate quadrant of the electronic meeting application. The electronic meeting summarization service may receive and/or process the electronic meeting data (e.g., video data, audio data) from the electronic meeting as the meeting is still in progress, or the electronic meeting summarization service may receive and/or process the electronic meeting data from the electronic meeting after the meeting ends. In some examples, the electronic meeting summarization service may only receive and/or process the electronic meeting data if one or more meeting participants affirmatively allow the electronic meeting summarization to access that data (e.g., via electronic meeting privacy settings).

The electronic meeting summarization service may process the electronic meeting data from each participant of an electronic meeting separately. For example, the electronic meeting summarization service may process the video and audio meeting data received from a first computing device associated with a first participant separately from the video and audio meeting data received from a second computing device associated with a second participant. Thus, in this example, the electronic meeting summarization service may process the video and audio meeting data from each participant, at least initially, separately from the video and audio meeting data from each other participant. In other examples, the electronic meeting summarization service may process the video and/or audio meeting data received from each of the devices together.

Once received, the electronic meeting summarization service may determine whether electronic meeting data includes video and/or audio data. If the electronic meeting data for a participant includes audio data, it may be processed by a speech to text engine to generate a transcript of the electronic meeting. In some examples, the electronic meeting summarization service may process the entirety of the audio data from each participant at the same time to generate a transcript of an entire electronic meeting. In examples, the text of a transcript that is generated for an electronic meeting may be tagged with the participant identities at locations in the transcript where those participants spoke during the electronic meeting. The electronic meeting summarization service may process the transcript with cognitive language understanding engine 122.

Cognitive language understanding engine 122 may comprise one or more machine learning models that have been trained to calculate textual importance scores from text. The electronic meeting summarization service may calculate textual importance scores based on an importance of a sentence, string of text, and/or section of the transcript to the meeting participants generally (e.g., what is the importance of a portion of text to each of the participants as a group). In other examples, the electronic meeting summarization service may calculate textual importance scores based on an importance of a sentence, string of text, and/or section of the transcript to the meeting participants individually (e.g., what is the importance of a portion of text to a specific participant). The one or more machine learning models may comprise a recurrent neural network. In some examples, the recurrent neural network may comprise a Long Short Term Memory (LSTM) neural network and/or a Gated Recurrent Unit (GRU) neural network. In additional examples, the one or more machine learning models may comprise a text embedding model (e.g., Bidirectional Encoder Representations from Transformers (BERT), Embeddings from Language Models (ELMo)).

If the electronic meeting data for a participant includes video data, it may be processed by cognitive vision understanding engine 124. Cognitive vision understanding engine 124 may comprise one or more machine learning models (e.g., neural networks) that have been trained to calculate visual importance and/or interest scores from video data of users/participants. The electronic meeting summarization service may calculate the visual importance scores based on facial features and/or physical actions or mannerisms made by meeting participants in association with the words that were spoken at those times. That is, visual importance scores calculated by cognitive vision understanding engine 124 may be matched against text in a meeting transcript to determine which sections of an electronic meeting are of interest and/or important to a participant and/or a group of participants. In some examples, the visual importance scores may be calculated to take into account baseline features for a meeting participant. For example, a meeting participant may nod frequently and thus nodding for that participant does not necessarily equate to importance and/or agreement with a section of a meeting. In some examples, a visual importance score for a section of an electronic meeting may be calculated from a plurality of sub-visual importance scores, where each sub-visual importance scores correspond to a different meeting participant. For example, if a determination is made by vision understanding engine 124 that a high percentage of participants express interest (e.g., corresponding to a high sub-visual importance score for each of those users) in a particular section of an electronic meeting, the visual importance score for that section would be high despite one or more meeting participants expressing no interest (e.g., corresponding to a low sub-visual importance score for each of those users) in that section.

The electronic meeting summarization service may determine a combined importance score for a section of an electronic meeting based on a textual importance score for the section and a visual importance score for an electronic meeting. For example, a function may be applied to the textual importance score and the visual importance score for a section of an electronic meeting, and the combined importance score may be calculated based on application of that function. In some examples, the textual importance score and the visual importance score may have equal weight. In other examples the textual importance score may be weighted more or less than the visual importance score. In some examples, if the combined importance score for a section of an electronic meeting exceeds a threshold value, the electronic meeting summarization service may generate summary content for that section of the electronic meeting. The summary content may comprise an indication of an importance of that section of the electronic meeting data.

In some examples, if more than one section of an electronic meeting has a combined importance score that is more than a threshold value, content ranking engine 126 may rank each of those sections based on their combined importance. The ranking may be utilized to determine how to surface the summary of an electronic meeting. For example, if a first section of an electronic meeting is ranked higher than a second section of an electronic meeting, but both sections have combined importance scores that exceed the threshold value, the first section (or summary of the first section) may be surfaced more prominently in a summary than the second section (or summary of the second section).

Although not shown, computing environment 100 may additionally include a task identification engine. The task identification engine may comprise one or more machine learning models that may process a transcript of an electronic meeting to identify one or more tasks that were assigned to participants during an electronic meeting. The one or more machine learning models may comprise contextual embedding models, as more fully discussed below in relation to FIG. 7. In additional examples, if a determination is made that a task was assigned to a participant during an electronic meeting, the task identification engine may classify the task type that was assigned.

Action engine 128 may perform one or more operations associated with determining whether one or more tasks associated with one or more participants of an electronic meeting are desired to be moved to a new stage of completion in their lifecycle. In some examples, if a determination is made that a task is desired to be moved to a new stage in its lifecycle, the electronic meeting summarization service may automatically move that task to the new stage. In other examples, if a determination is made that a task is desired to be moved to a new stage in its lifecycle, the electronic meeting summarization service may indicate that such a determination has been made in an electronic meeting summary That indication may include a selectable element for automatically moving the task to the new stage in its lifecycle.

Although not shown, computing environment 100 may include a document identification engine. The document identification engine may perform one or more operations associated with identifying documents that are relevant to an electronic meeting. In some examples, the document identification engine may comprise one or more machine learning models that have been trained to process text and identify relevant documents based on that processing. The one or more machine learning models may comprise contextual embedding models, as more fully discussed below in relation to FIG. 6.

In this example, the electronic meeting summarization service has determined that one or more sections of the electronic meeting have a combined importance score over a threshold value. The electronic meeting summarization service has also determined that one or more tasks were assigned to one or more users during the electronic meeting. The electronic meeting summarization service has further identified one or more electronic documents that were mentioned during the electronic meeting and/or that were identified as being relevant to the electronic meeting. The electronic meeting summarization service thus generates a meeting summary that includes a summarization and/or indication of each of those elements.

In this example, the summarization is sent to one or more participants of the electronic meeting as an electronic message. Specifically, electronic meeting summarization service sends an electronic message including meeting summary 134, which is displayed on computing device 132 in electronic meeting summary sub-environment 130. Meeting summary 134 includes tasks assigned element 136, which may include an indication and/or summary of one or more tasks that were assigned to a participant of the electronic meeting. Meeting summary 134 also includes key points element 138, which may include an indication and/or summary of one or more sections of textual content from the transcript of the electronic meeting for which a combined importance score exceeds a threshold value. Meeting summary 134 further includes documents mentioned element 140, which may include one or more electronic documents that were mentioned during the electronic meeting and/or that were identified as being relevant to the electronic meeting. According to some examples, the elements included in meeting summary 134 may be arranged in their display based on their respective combined importance scores. For example, if a first section of the electronic meeting has a first key point in it and the combined importance score for that section is X, and a second section of the electronic meeting has a second key point in it and the combined importance score for that section is X+1, the first key point may be displayed more prominently (e.g., above, in bigger text, in bold text, highlighted, etc.) than the second key point.

The electronic meeting summarization service has determined a participation score for each of the participants of the electronic meeting. The participation score for a participant may correspond to an amount of time that a participant spoke, presented, and/or was active during an electronic meeting. In additional examples, the participant score for a participant may correspond to an amount of text in a transcript for an electronic meeting for the participant. Meeting summary 134 further includes active participants element 142, which may include an indication and/or summarization of the level and/or amount of participation of each of the electronic meeting participants during the electronic meeting.

Figure 2:
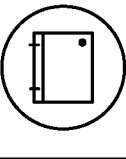
FIG. 2 illustrates a computing device displaying a textual version of an electronic meeting summary that has been generated via application of machine learning models to electronic meeting data.

FIG. 2 illustrates a computing device 202 displaying a textual version of an electronic meeting summary 206 that has been generated via application of machine learning models to electronic meeting data. Meeting summary 206 was sent to a participant of an electronic meeting via electronic message 204.

Meeting summary 206 includes the subject "Highlights from your recent Quarterly Sales Report meeting", with a time and date. The time and date may correspond to a time of the electronic meeting, a time that meeting summary 206 was generated, and/or a time that electronic message 204 including meeting summary 206 was sent and/or received. The time and date are "Tue 7/12/2020 3:10 PM". Meeting summary 206 is addressed to a meeting participant associated with computing device 202. That meeting participant is Mike Smith. Meeting summary 206 states: "Hey Mike, Here are some important tasks, key points, documents and activity from a recent meeting you missed. Read the full transcription here." The "read the full transcription here" here portion of that text is associated with a link that may be selected for downloading and/or otherwise accessing a full transcript of the electronic meeting.

Meeting summary 206 includes an indication of a task that was assigned to the user (Mike Smith) that received electronic message 204 during the electronic message. Specifically, meeting summary 206 includes task element 208, which includes the heading "Tasks that were assigned to you during the meeting" and a description "Jasmin S, your CEO, asked that you come up with a plan to penetrate the China market, including cost, timeline and outcomes (see related documents)".

Meeting summary 206 includes an indication of a plurality of key points that were identified in the meeting. The key points may correspond to sections of the electronic meeting for which a combined importance score was determined to be above a threshold value. Specifically, meeting summary 206 includes key points element 210, which includes the heading "Key points from the meeting" and three descriptions of different key points. A first description for a first key point states "David P looked frustrated with the progress made in UK". A second description for a second key point states "John A suggested that [group A] expand its marketing efforts in South East Asia". A third description for a third key point states "Multiple people appeared interested when US sales progress was reviewed".

Meeting summary 206 includes an indication of a plurality of documents that were mentioned during the electronic meeting. Specifically, meeting summary 206 includes documents element 210, which includes an indication of a first document ("Quarterly Sales Report.pptx") mentioned during the electronic meeting, and an indication of a second document ("Quarterly sales distribution across regions.xlsx") mentioned during the electronic meeting. In some examples, those document elements may be selectable for downloading and/or navigating to the corresponding electronic documents.

Figure 3:
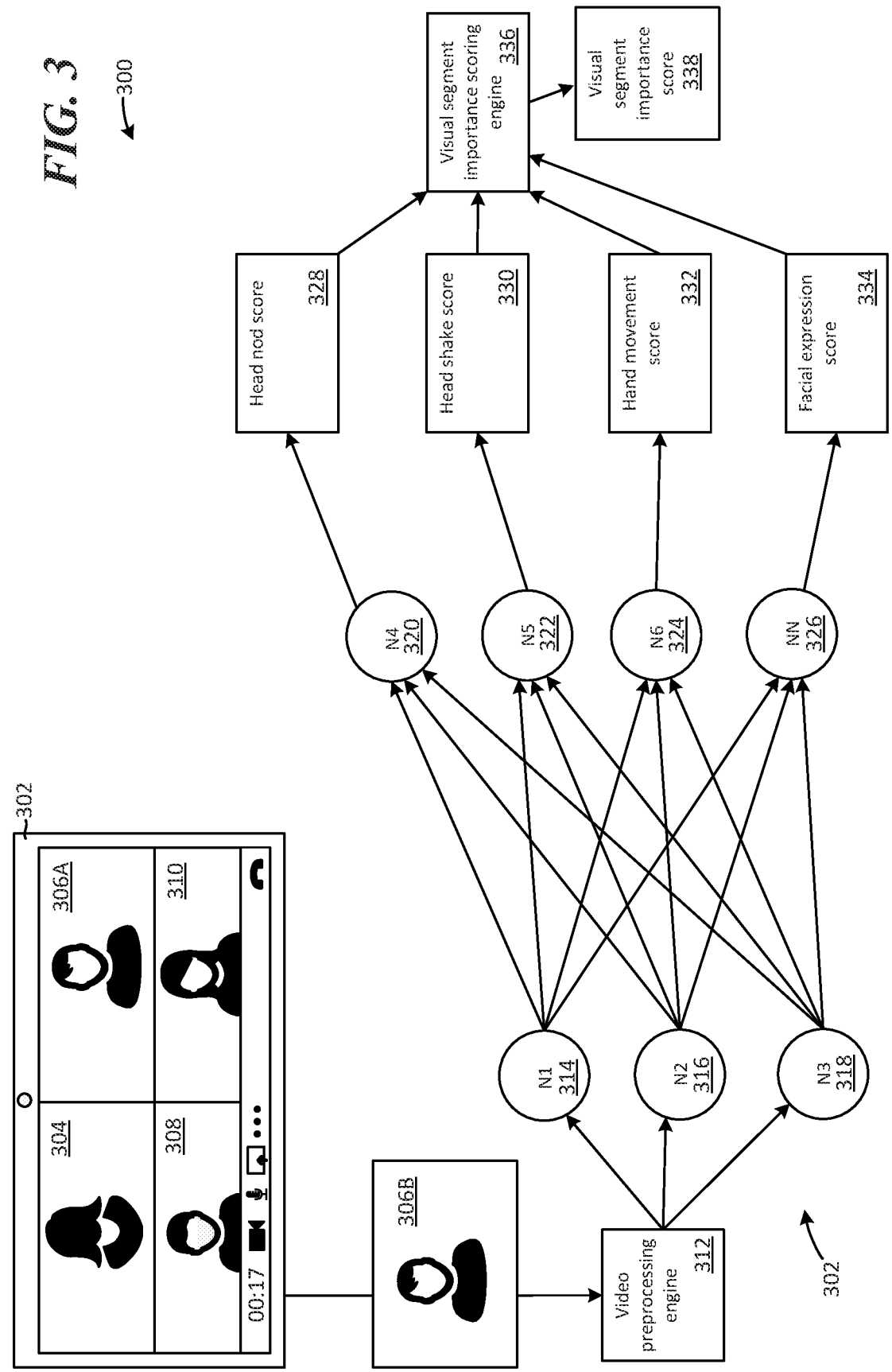
FIG. 3 illustrates a computing environment for the processing of video meeting data with a neural network to determine a visual importance score for a section of an electronic meeting.

FIG. 3 illustrates a computing environment 300 for the processing of video meeting data with a neural network 302 to determine a visual importance score for a section of an electronic meeting. In addition to neural network 302, computing environment 300 includes computing device 302, video data 306B, video preprocessing engine 312, head nod score 328, head shake score 330, hand movement score 332, facial expression score 334, visual segment importance engine 336, and visual segment importance score 338.

Computing device 302 displays an electronic meeting application with an electronic meeting that is currently in progress. The electronic meeting has four active participants, with video of each of the four participants being displayed in a separate quadrant of the electronic meeting application. Specifically, first window 304 in the upper left quadrant displays a video feed of a first participant, second window 306A in the upper right quadrant displays a video feed of a second participant, third window 308 in the lower left quadrant displays a video feed of a third participant, and fourth window 310 in the lower right quadrant displays a video feed of a fourth participant.

The electronic meeting summarization service may receive and/or process the electronic meeting data (e.g., video data, audio data) from the electronic meeting as the meeting is still in progress, or the electronic meeting summarization service may receive and/or process the electronic meeting data from the electronic meeting after the meeting ends. In some examples, the electronic meeting summarization service may only receive and/or process the electronic meeting data if one or more meeting participants affirmatively allow the electronic meeting summarization to access that data (e.g., via electronic meeting privacy settings).

In this example, the electronic meeting summarization service receives video data 306B of the second participant, although it should be understood that the electronic meeting summarization service may receive and process video from each of the participants that it has video meeting data for. Video data 306B is processed by video preprocessing engine 312. Video preprocessing engine 312 may perform one or more preprocessing operations on one or more images included in video data 306B prior to video data 306B being provided to neural network 302. The one or more preprocessing operations may comprise image/video filtering operations and/or image/video augmentation operations. Examples of pre-processing operations that may be performed include resizing images/video, removing noise (e.g., blurring an image with a Gaussian function), segmenting an image/video, separating background from foreground objects, and applying custom filters.

Once the preprocessing of video data 306B has been completed, the pre-processed data may be transformed into vector format and provided to a first layer of neural network 302. The first layer of neural network 302 includes neuron 314, neuron 316, and neuron 318. The first layer of neural network 302 then feeds its values into a second, output layer, of neural network 302. The second layer of neural network 302 includes neuron four 320, neuron five 322, neuron six 324, and neuron N 326. One or more activation functions (softmax function, sigmoid function) may be applied to output values from the neurons of the second layer of neural network 302, and cognitive feature scores may be calculated for the second electronic meeting participant.

Once an activation function is applied to the value from neuron four 320, head nod score 328 is generated. Head nod score 328 may be indicative of whether a meeting participant agrees with what is being said or what is being presented in a meeting.

Once an activation function is applied to the value from neuron five 322, head shake score 330 is generated. Head shake score 330 may be indicative of whether a meeting participant disagrees with what is being said or what is being presented in a meeting.

Once an activation function is applied to the value from neuron six 324, hand movement score 332 is generated. Hand movement score 332 may be indicative of a meeting participant expressing interest in a what is being said or what is being presented in a meeting.

Once an activation function is applied to the value from neuron N 326, facial expressions score 334 is generated. Facial expression score 334 is representative of one or more facial expression types (e.g., confused, excited, interested, agreement, disagreement, etc.). Facial expression score 334 is indicative of a meeting participant expressing one or more emotions in relation to what is being said or what is being presented in a meeting.

Visual segment importance scoring engine may apply one or more functions to visual cognitive scores (e.g., head nod score 328, head shake score 330, hand movement score 332, facial expressions core 334) to generate a combined visual cognitive score for a segment of an electronic meeting. The combined visual cognitive score for a segment of the illustrated video for the second electronic meeting participant is represented by visual segment importance score 338.

Figure 4:
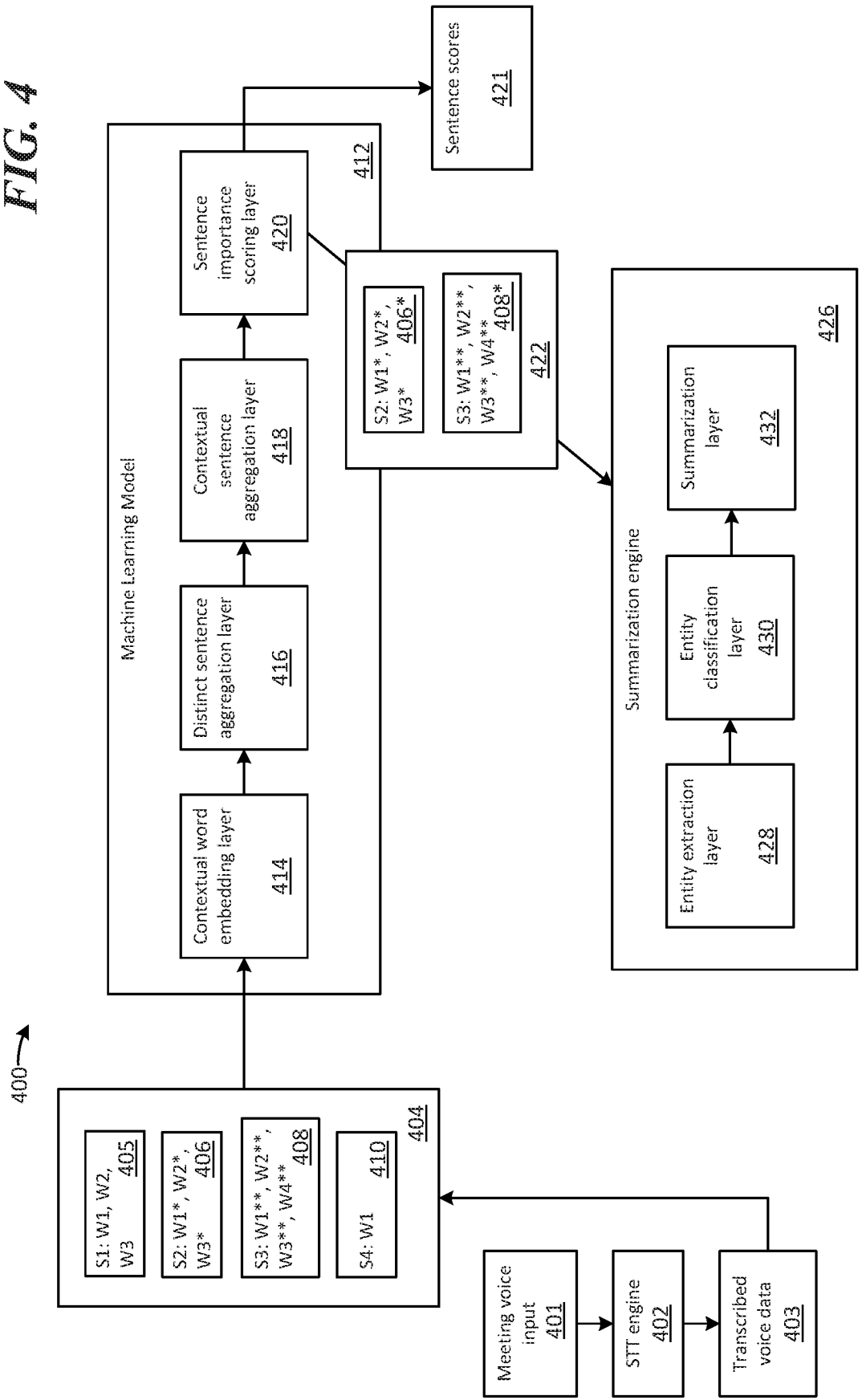
FIG. 4 illustrates a computing environment for the processing of a meeting transcript by a machine learning model to identify important sentences and the subsequent processing of the important sentences by a summarization engine.

FIG. 4 illustrates a computing environment 400 for the processing of a meeting transcript by a machine learning model 412 to identify important sentences and the subsequent processing of the important sentences by a summarization engine 426.

Meeting voice input 401 is received for a plurality of participants of an electronic meeting. Speech to text engine 402 then processes meeting voice input 401 and produces a transcription of the electronic meeting, as indicated by transcribed voice data 403. Transcribed voice data 403 is then provided to machine learning model 412 for additional processing.

Machine learning model 412 includes contextual word embedding layer 414, distinct sentence aggregation layer 416, contextual sentence aggregation layer 418, and sentence importance scoring layer 420. Machine learning model 412 receives sentences 404 from transcribed voice data 403. In this example, sentences 404 includes four sentences: sentence one 405, sentence two 406, sentence three 408, and sentence four 410. Although the inputs are described as sentences, it should be understood that those inputs may be processed and classified in alternate ways (e.g., as strings, as utterances).

Each of sentences 404 is processed by machine learning model 412. Contextual word embedding layer 414 generates an embedding for each word in each of sentences 404. In generating an embedding for each word, contextual word embedding layer 414 may apply a contextual model to each of sentences 404. In examples, the contextual model that is applied may be a bidirectional encoder representations from transformers (BERT) model. In other examples, the contextual model may be a Sent2Vec model, Embeddings from Language Models (ELMo), Recurrent Neural Networks model, etc.

Distinct sentence aggregation layer 416 aggregates the embeddings for each word in sentences 404 into a distinct embedding for each of sentences 404. In aggregating the embeddings for each word, distinct sentence aggregation layer 416 may apply a neural network to the embeddings for each word. In examples, the neural network may comprise a gated recurrent unit (GRU) neural network or bi-GRU neural network. In other examples, the neural network may comprise a long short-term memory (LSTM) neural network.

Contextual sentence aggregation layer 418 aggregates each distinct embedding for each of sentences 404 into a contextual embedding for each of sentences 404. In aggregating the distinct embeddings for each sentence, contextual sentence aggregation layer 418 may apply a neural network to each distinct embedding for each of sentences 404. In examples, the neural network may comprise a gated recurrent (GRU) neural network or bi-GRU neural network. In other examples, the neural network may comprise a long short-term memory (LSTM) neural network.

Sentence importance scoring layer 420 scores and ranks each of sentences 404 based on their importance. In some examples, sentence importance scoring layer 420 may score and rank each of sentences 404 based on their relative importance to each meeting participant of the electronic meeting so that summaries of the electronic meeting can be tailored to each participant. In additional examples, sentence importance scoring layer 420 may score and rank each of sentences 404 based on their relative importance to different organizational groups (e.g., human resources, legal, engineering, devices, software, etc.) so that summaries of the electronic meeting can be tailored to different user groups. The scores for each of sentences 404 are illustrated by sentence scores element 421. In scoring each of sentences 404, sentence importance scoring layer 420 may apply a classifier function to each contextual embedding for each of the plurality of sentences (e.g., the embeddings generated by contextual sentence aggregation layer 418). In examples, the classifier function may comprise a sigmoid function. Other activation functions (e.g. tan h, softplus, etc.) may be utilized for scoring each sentence. In some examples, the model may be trained with a binary cross entropy loss using gold notated relevance scores. Other ways of training this model may include utilizing a margin-based hinge loss function.

According to examples, a threshold value may be utilized to determine which sentences to further process for summarization by summarization engine 426. For example, the values that are calculated for each of sentences 404 via sentence importance scoring layer 420 may be compared to a threshold value. If a sentence has a value that meets or exceeds the threshold value, that sentence may be processed by summarization engine 426. If a sentence has a value that does not meet or exceed the threshold value, that sentence may not be processed further. The threshold value may be adjusted manually or automatically. For example, as machine learning model 412 is trained, the threshold value may be lowered or increased. In this example, sentence two 406* and sentence three 408* have been determined to have met the minimum threshold and they are therefore sent to summarization engine 426 for processing as indicated by relevant sentences 422.

Summarization engine 426 includes entity extraction layer 428, entity classification layer 430, and summarization layer 432. Entity extraction layer 428 may identify and/or extract entities that are relevant to meeting summarization. Entity classification layer 430 may classify those entities by entity type (e.g., tasks assigned, key points, key point types, documents, document topics, active participants). Summarization layer 432 may generate one or more meeting summaries, or summary components, based on the processing performed by machine learning model 412 and/or summarization engine 426.

Summarization engine 426 and the layers therein are provided for illustrative purposes and it should be understood that more, fewer, and/or different layers may be applied to relevant sentences 422 to assist with meeting summarization.

Figure 5:
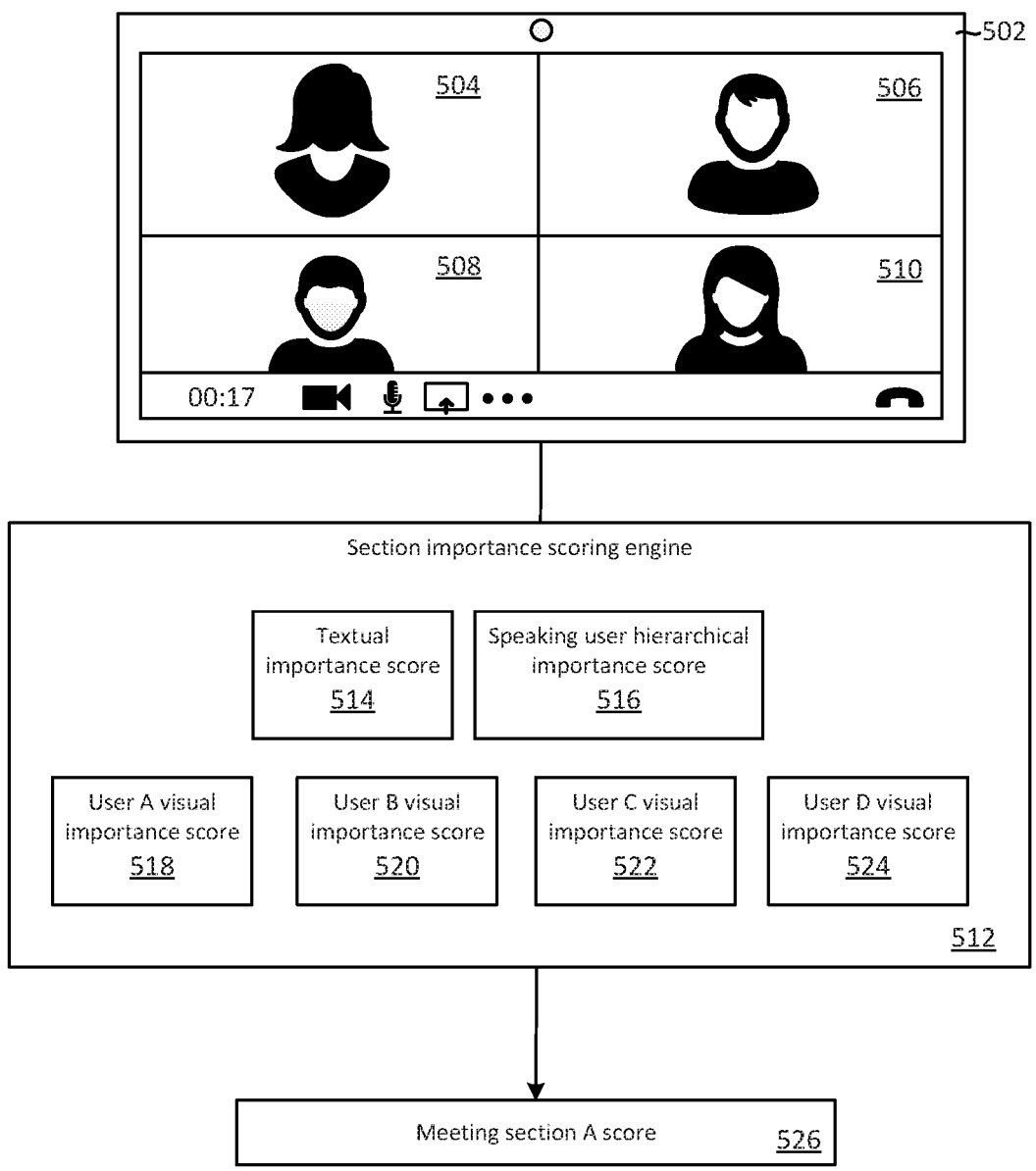
FIG. 5 illustrates a computing environment for the aggregate processing of a textual importance score, a hierarchical importance score, and a plurality of visual importance scores, to determine a combined importance score for a meeting section of an electronic meeting.

FIG. 5 illustrates a computing environment 500 for the aggregate processing of a textual importance score, a hierarchical importance score, and a plurality of visual importance scores, to determine a combined importance score for a meeting section of an electronic meeting. Computing environment 500 includes computing device 502, section importance scoring engine 512, and meeting section A score 526.

Computing device 502 displays an electronic meeting application with an electronic meeting that is currently in progress. The electronic meeting has four active participants, with video of each of the four participants being displayed in a separate quadrant of the electronic meeting application. Specifically, first window 504 in the upper left quadrant displays a video feed of a first participant (User A), second window 506 in the upper right quadrant displays a video feed of a second participant (User B), third window 508 in the lower left quadrant displays a video feed of a third participant (User C), and fourth window 510 in the lower right quadrant displays a video feed of a fourth participant (User D).

The electronic meeting summarization service may process voice audio data and video data from the electronic meeting. In some examples, the electronic meeting summarization service may apply a speech to text engine to the voice audio data and generate a transcript of the electronic meeting. The electronic meeting summarization service may then apply a cognitive language machine learning model (e.g., machine learning model 412) to the transcript to determine a textual importance score for one or more sections of the electronic meeting (e.g., based on textual importance scores that are assigned to one or more sections of the transcript). A textual importance score for a section of the electronic meeting is illustrated by textual importance score 514.

The electronic meeting summarization service may apply a cognitive vision understanding machine learning model (e.g., neural network 302) to the video data for each of the participants of the electronic meeting for which there is video data to determine a visual importance score for one or more sections of the electronic meeting. In this example, a visual importance score for user A and a first section of the electronic meeting is illustrated by user A visual importance score 518, a visual importance score for user B and the first section of the electronic meeting is illustrated by user B visual importance score 520, a visual importance score for user C and the first section of the electronic meeting is illustrated by user C visual importance score 522, and a visual importance score for user D and the first section of the electronic meeting is illustrated by user D visual importance score 524.

In some examples, the electronic meeting summarization service may determine a hierarchical importance score for each participant of the electronic meeting and/or one or more sections of the electronic meeting. This is illustrated by speaking user hierarchical importance score 516. The hierarchical importance score may be determined based on a hierarchical organization chart for an organization. In some examples, a higher hierarchical importance score may be assigned to users (e.g., user utterances) that are higher up in the hierarchical organizational chart than for users (e.g., user utterances) that are lower down in the hierarchical organizational chart. In additional examples, a higher hierarchical importance score may be assigned to users (e.g., user utterances) that have an expertise related to a determined meeting subject than to users (e.g., user utterances) that do not have an expertise related to a determined meeting subject.

The electronic summarization service may apply one or more functions to textual importance score 514, speaking user hierarchical importance score 516, user A visual importance score 518, user B visual importance score 520, user C visual importance score 522, and/or user D visual importance score 524 for one or more sections of the electronic meeting, and determine a combined importance score for those one or more sections of the electronic meeting. The combined importance score for a section of the electronic meeting is illustrated by meeting section A score 526.

Figure 6:
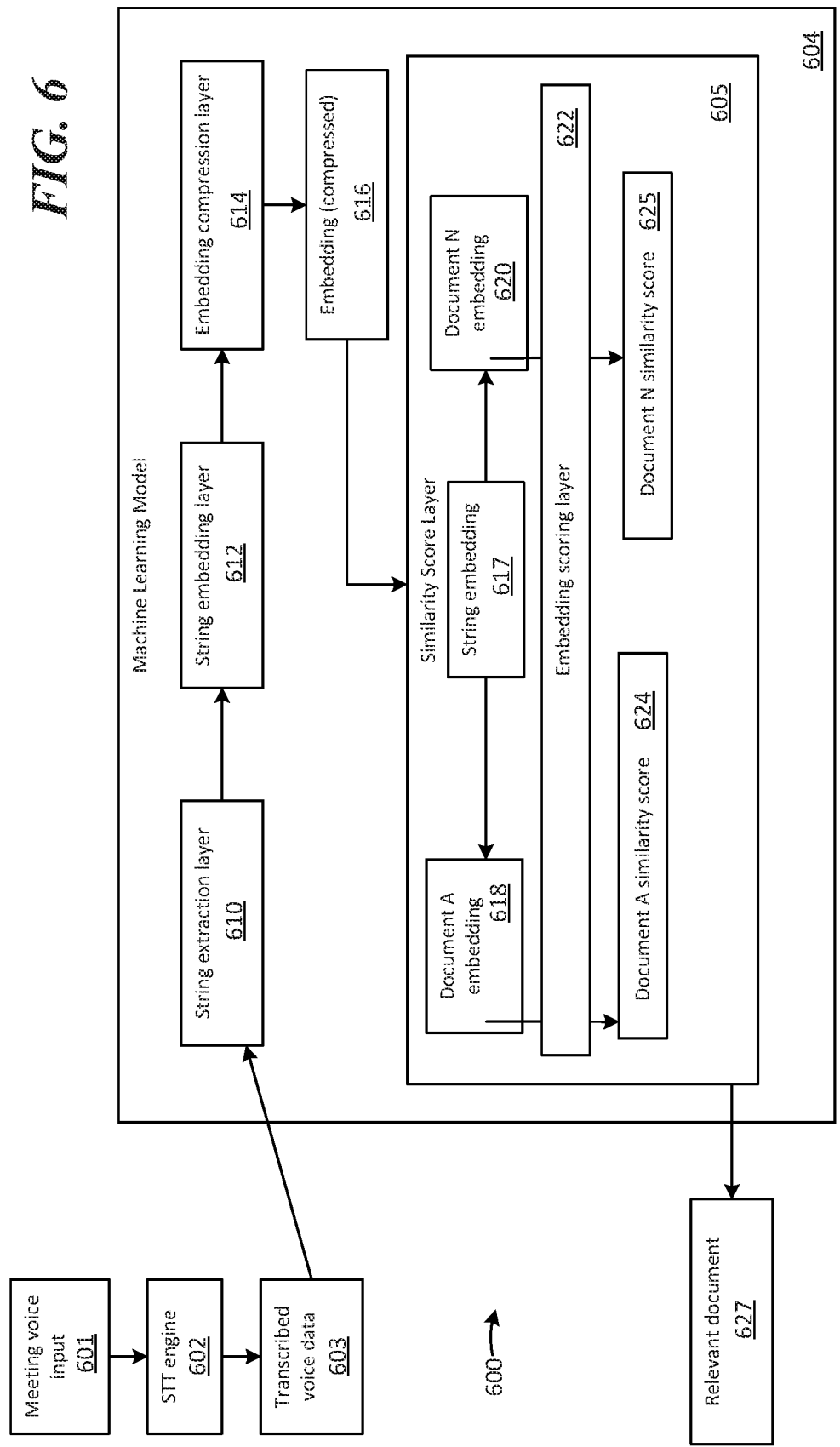
FIG. 6 is a block diagram illustrating an exemplary machine learning model that may be utilized to identify important documents that have been referenced in an electronic meeting.

FIG. 6 is a block diagram 600 illustrating an exemplary machine learning model 604 that may be utilized to identify important documents that have been referenced in an electronic meeting.

Meeting voice input 601 is received for a plurality of participants of an electronic meeting. Speech to text engine 602 then processes meeting voice input 601 and produces a transcription of the electronic meeting, as indicated by transcribed voice data 603. Transcribed voice data 603 is then provided to machine learning model 604 for additional processing.

In machine learning model 604, transcribed voice data 603 is first processed by string extraction layer 610. String extraction layer 610 may apply one or more rules to identify and tag individual strings from transcribed voice data 603 for further processing. For example, a first rule may dictate that any full sentence (e.g., ending with punctuation) is tagged as a string. A second rule may dictate that any set of words over length X be tagged as an individual string.

From string extraction layer 610, the strings are passed to string embedding layer 612. String embedding layer 612 comprises a language embedding model. The language embedding model creates an embedding for each string. The language embedding model may comprise a contextual embedding model (e.g., a BERT model, an ELMo model, a recurrent neural network model, a long short term memory (LSTM) model, a gated recurrent units (GRU) model). In some examples, string embedding layer 612 may combine the embeddings from one or more strings of a transcript into section embeddings for sections of the transcript, or combine the embeddings for all of the strings of a transcript into an overall embedding for the transcript.

The embeddings generated at string embedding layer 612 may be passed to embedding compression layer 614. Embedding compression layer 614 may comprise a model for transforming a continuous embedding generated for a string by string embedding layer 612 into a binary form. As examples, embedding compression layer 614 may comprise one or more of: a direct binarization with a hard threshold model, reducing the dimensionality with either a random projection or principal component analysis model, and/or an encoding-decoding framework with an additional semantic-preserving loss model.

The compressed (binary) embedding for each string (or embeddings for sections of the transcript or the transcript as a whole) is represented by compressed embedding element 616. The embedding for a string (or embeddings for sections of the transcript or the transcript as a whole) is represented in a compressed or uncompressed form as string embedding 617 in similarity score layer 605. The embedding is incorporated in an embedding library comprised of a plurality of language embeddings for other documents (e.g., document A embedding 618, document N embedding 620). Similarity scores may be calculated via application of a similarity score model to the new embeddings from the newly embedded strings, and one or more of the embeddings from the embedding library (e.g., document A embedding 618, document N embedding 620). In some examples, the similarity score model may be a cosine model. In other examples, the similarity score model may be a Hamming model. In this example, this is illustrated by similarity score layer 605.

A similarity score may be calculated between each embedded string (or for transcript section embeddings or an embedding for the transcript as a whole) and an embedding for document A embedding 618. The scoring and calculation are illustrated by embedding scoring layer 622. Thus, a similarity score, such as document A similarity score 624, may be calculated for one or more of the strings included in transcribed voice data 603 and document A embedding 618.

A similarity score may also be calculated between each embedded string (or for transcript section embeddings or an embedding for the transcript as a whole) and an embedding for document N embedding 620. The scoring and calculation are illustrated by embedding scoring layer 622. Thus, a similarity score, such as document N similarity score 625, may be calculated for one or more strings included in transcribed voice data 603 and document N embedding 620.

Relevant document 627 may correspond to one or more highest scored documents from similarity score layer 605. Relevant document 627, or a link to relevant document 627, may be caused to be surfaced in a meeting summary. In some examples, relevant document 627, or a link to relevant document 627, may only be surfaced in a meeting summary if the similarity score for that document (e.g., document A similarity score 624, document N similarity score 625) is above a threshold value.

Figure 7:
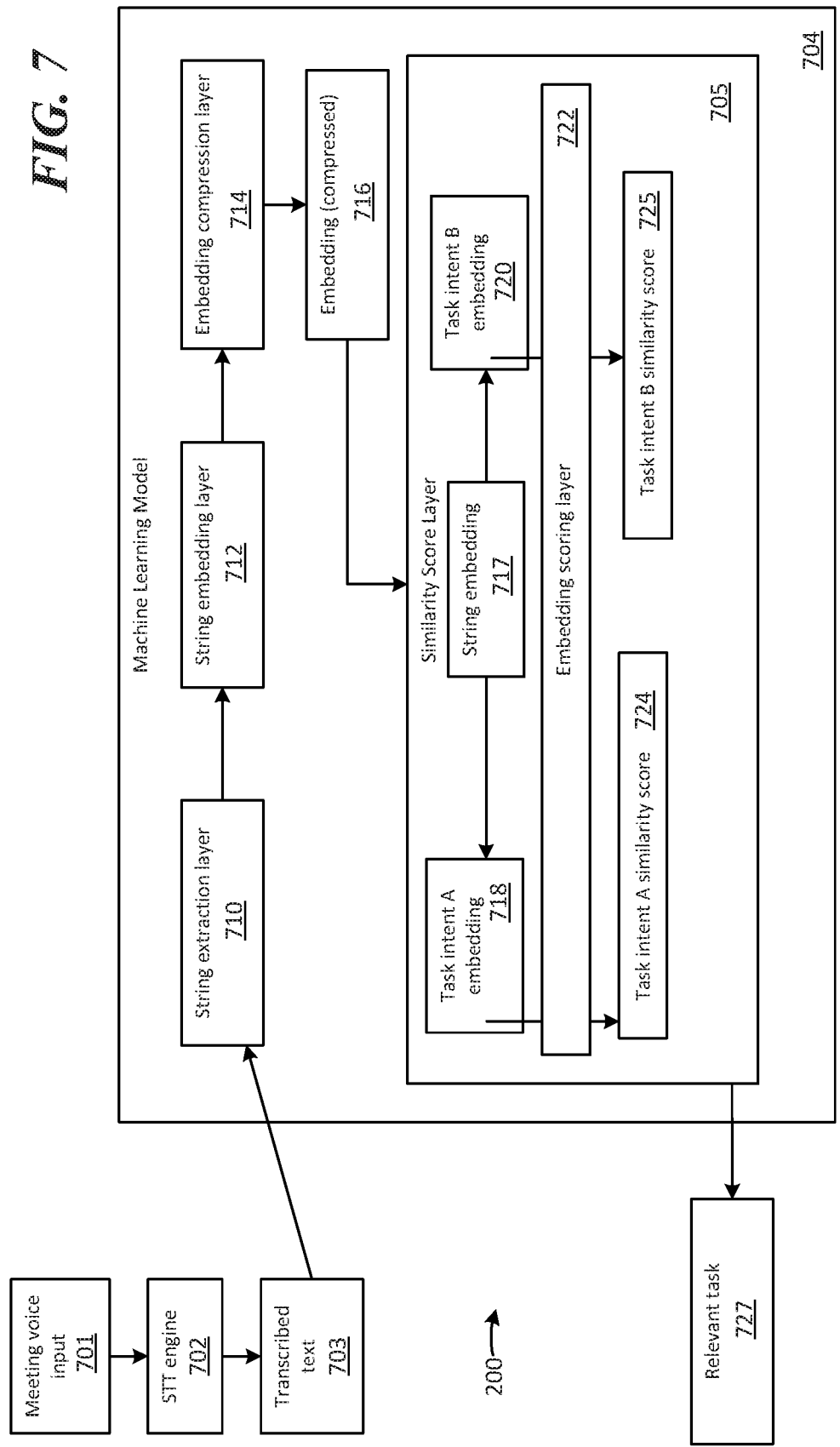
FIG. 7 is a block diagram illustrating an exemplary machine learning model that may be utilized to identify tasks that have been assigned to users in an electronic meeting.

FIG. 7 is a block diagram 700 illustrating an exemplary machine learning model 704 that may be utilized to identify tasks that have been assigned to users in an electronic meeting.

Meeting voice input 701 is received for a plurality of participants of an electronic meeting. Speech to text engine 702 then processes meeting voice input 701 and produces a transcription of the electronic meeting, as indicated by transcribed voice data 703. Transcribed voice data 703 is then provided to machine learning model 704 for additional processing.

In machine learning model 704, transcribed voice data 703 is first processed by string extraction layer 710. String extraction layer 710 may apply one or more rules to identify and tag individual strings from transcribed voice data 703 for further processing. For example, a first rule may dictate that any full sentence (e.g., ending with punctuation) is tagged as a string. A second rule may dictate that any set of words over length X be tagged as an individual string.

From string extraction layer 710, the strings are passed to string embedding layer 712. String embedding layer 712 comprises a language embedding model. The language embedding model creates an embedding for each string. The language embedding model may comprise a contextual embedding model (e.g., a BERT model, an ELMo model, a recurrent neural network model, a long short term memory (LSTM) model, a gated recurrent units (GRU) model). In some examples, string embedding layer 712 may combine the embeddings from one or more strings of a transcript into section embeddings for sections of the transcript, or combine the embeddings for all of the strings of a transcript into an overall embedding for the transcript.

The embeddings generated at string embedding layer 712 may be passed to embedding compression layer 714. Embedding compression layer 714 may comprise a model for transforming a continuous embedding generated for a string by string embedding layer 712 into a binary form. As examples, embedding compression layer 714 may comprise one or more of: a direct binarization with a hard threshold model, reducing the dimensionality with either a random projection or principal component analysis model, and/or an encoding-decoding framework with an additional semantic-preserving loss model.

The compressed (binary) embedding for each string (or embeddings for sections of the transcript or the transcript as a whole) is represented by compressed embedding element 716. The embedding for a string (or embeddings for sections of the transcript or the transcript as a whole) is represented in a compressed or uncompressed form as string embedding 717 in similarity score layer 705. The embedding is incorporated in an embedding library comprised of a plurality of language embeddings for task intent types (e.g., task intent A embedding 718, task intent B embedding 720). Similarity scores may be calculated via application of a similarity score model to the new embeddings from the newly embedded strings, and one or more of the embeddings from the embedding library (e.g., task intent A embedding 718, task intent B embedding 720). In some examples, the similarity score model may be a cosine model. In other examples, the similarity score model may be a Hamming model. In this example, this is illustrated by similarity score layer 705.

A similarity score may be calculated between each embedded string (or for transcript section embeddings or an embedding for the transcript as a whole) and an embedding for task intent A embedding 718. The scoring and calculation are illustrated by embedding scoring layer 722. Thus, a similarity score, such as task intent A similarity score 724, may be calculated for one or more of the strings included in transcribed voice data 703 and task intent A embedding 718.

A similarity score may also be calculated between each embedded string (or for transcript section embeddings or an embedding for the transcript as a whole) and an embedding for task intent B embedding 720. The scoring and calculation are illustrated by embedding scoring layer 722. Thus, a similarity score, such as task intent B similarity score 725, may be calculated for one or more strings included in transcribed voice data 703 and task intent B embedding 720.

Relevant task 727 may correspond to one or more highest scored tasks from similarity score layer 705. An identity of relevant task 727, or contextual information related to relevant task 727, may be caused to be surfaced in a meeting summary. In some examples, relevant task 727, or contextual information related to relevant task 727, may only be surfaced in a meeting summary of an electronic meeting if the similarity score for that task (e.g., task intent A similarity score 724, task intent B similarity score 725) is above a threshold value.

Figure 8:
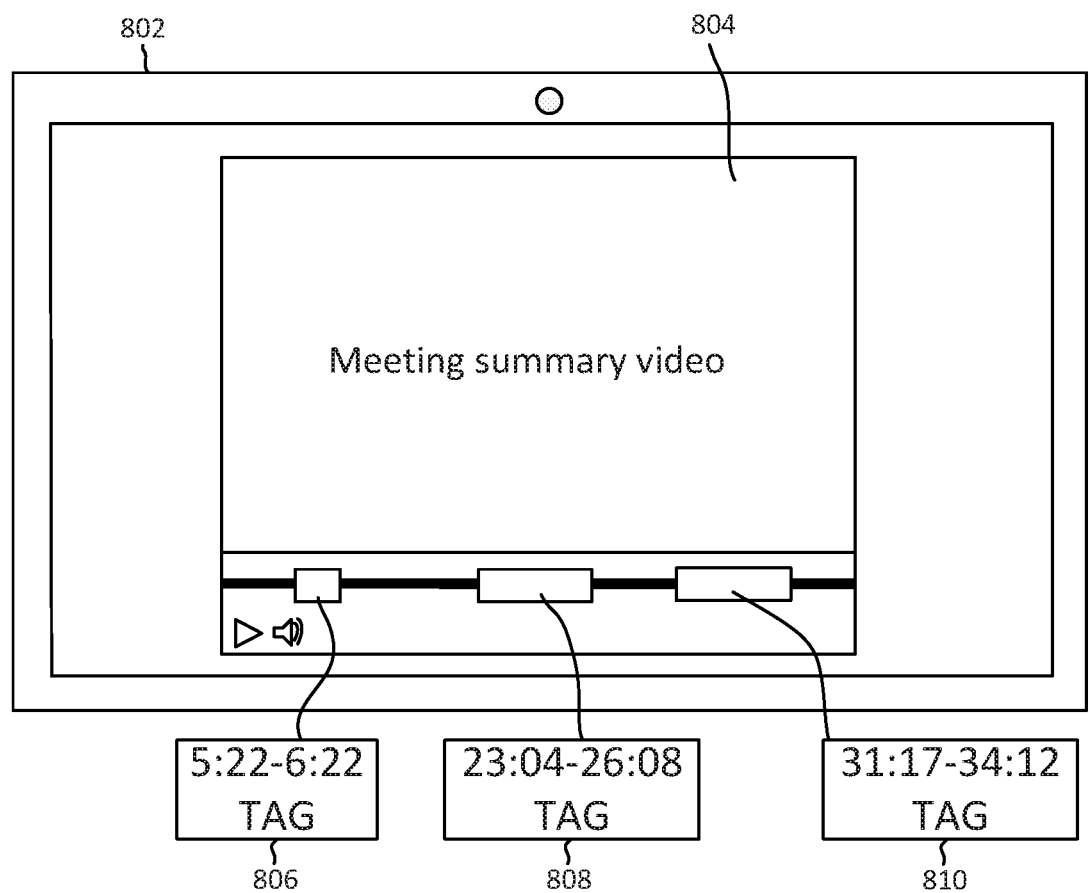
FIG. 8 illustrates a computing device displaying a video version of an electronic meeting summary that has been generated via application of machine learning models to electronic meeting data.

FIG. 8 illustrates a computing device 802 displaying a video version of an electronic meeting summary 804 that has been generated via application of machine learning models to electronic meeting data.

Electronic meeting summary 804 includes first tag 806, second tag 808, and third tag 810. First tag 806 is applied to a first section of an electronic meeting recording from beginning section time 5:22 to end section time 6:22. Second tag 808 is applied to a second section of the electronic meeting recording from beginning section time 23:04 to end section time 26:08. Third tag 810 is applied to a third section of the electronic meeting recording from beginning section time 31:18 to end section time 34:12. Each of the tags that have been applied to electronic meetings summary 804 represent sections of the electronic meeting for which a combined importance score has been determined to be above a threshold value. In some examples, in generating a video version of an electronic meeting summary, the electronic meeting summarization service may remove sections of an electronic meeting that are not determined to have a combined importance score above a threshold value. In other examples, in generating a video version of an electronic meeting summary, the electronic meeting summarization service may distinguish (e.g., visually, audibly) sections of an electronic meeting that are determined to have combined importance scores above a threshold value from sections of an electronic meeting that are determined to have combined importance scores that are below a threshold value.

A video version of an electronic meeting summary may have enhanced features associated with sections of an electronic meeting that are determined to have combined importance scores above a threshold value. For example, a video version of an electronic meeting summary may have "jump to" navigation that allows users to jump forward or backwards to sections of a recording that are determined to have combined importance scores above a threshold value. In additional examples, the electronic meeting summarization service may associate relevant documents or tasks with sections of a video version of an electronic meeting summary that are determined to have combined importance scores above a threshold value.

Figure 9:
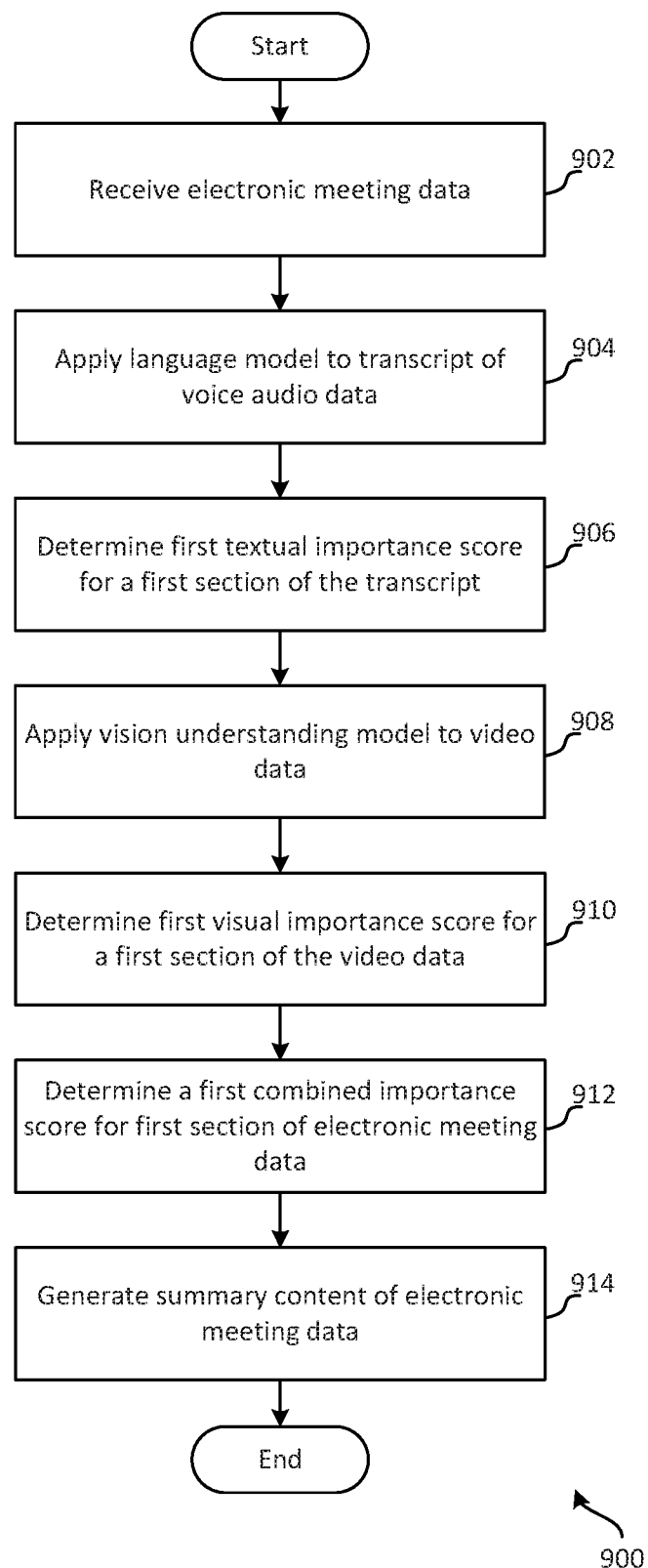
FIG. 9 is an exemplary method for generating summary content from electronic meetings.

FIG. 9 is an exemplary method 900 for generating summary content from electronic meetings. The method 900 begins at a start operation and flow moves to operation 902.

At operation 902 electronic meeting data is received. The electronic meeting data may comprise voice data from a plurality of users and video data of the plurality of users. The electronic meeting data may be received by an electronic meeting summarization service. The electronic meeting data corresponds to an electronic meeting that may include a plurality of users. The video data may comprise video data from each user that had her video turned on during the electronic meeting. The voice data may comprise audio data from each user that had her audio turned on during the electronic meeting.

From operation 902 flow continues to operation 904 where a language machine learning model is applied to a transcript of the voice audio data. The language machine learning model may be a cognitive model. The language machine learning model may have been trained to calculate textual importance scores from text. The language machine learning model may calculate textual importance scores based on an importance of a sentence, string of text, and/or section of the transcript to the meeting participants generally (e.g., what is the importance of a portion of text to each of the participants as a group). In other examples, the machine learning model may calculate textual importance scores based on an importance of a sentence, string of text, and/or section of the transcript to the meeting participants individually or as individual groups of users (e.g., what is the importance of a portion of text to a specific participant, what is the importance of a portion of text to a specific group of participants). The language machine learning model may comprise a recurrent neural network. In some examples, the recurrent neural network may comprise an LSTM neural network and/or a GRU neural network. In additional examples, the one or more machine learning models may comprise a text embedding model (e.g., BERT, ELMo).

From operation 904 flow continues to operation 906 where a first textual importance score for a first section of the transcript corresponding to a first section of the electronic meeting data is determined based on application of the language machine learning model to the transcript. As described above, the first textual importance score may be determined for a single participant (e.g., importance to a particular participant), the meeting group as a whole (e.g., importance to each participant), and/or a particular group of participants (e.g., importance to human resources participants, importance to legal participants, importance to engineer participants).

From operation 906 flow continues to operation 908 where a vision understanding model is applied to the video data. The vision understanding model may be a cognitive vision understanding model. The vision understanding model may comprise one or more neural networks that have been trained to calculate visual importance and/or interest scores from video data of users/participants.

From operation 908 flow continues to operation 910 where a first visual importance score for a first section of the video data corresponding to the first section of the electronic meeting data is determined based on application of the vision understanding machine learning model to the video data. The electronic meeting summarization service may determine visual importance scores based on facial features and/or physical actions or mannerisms made by meeting participants during an electronic meeting. In some examples, the first visual importance score may take into account baseline features for one or more meeting participants.

From operation 910 flow continues to operation 912 where a first combined importance score for the first section of the electronic meeting data is determined based on the first textual importance score and the first visual importance score. The first combined importance score may be above a threshold value.

From operation 912 flow continues to operation 914 where summary content of the electronic meeting data is generated. The summary content may comprise an indication of an importance of the first section of the electronic meeting data. In examples, the summary content may comprise information related to each section of the electronic meeting that is determined to have a combined importance score that is above the threshold value. The summary content may include tasks that were assigned during the electronic meeting, key points that were discussed during the electronic meeting, documents that were mentioned during the electronic meeting, and/or an indication of which participants were active or most active during the electronic meeting.

From operation 914 flow moves to an end operation and the method 900 ends.

Figure 10:
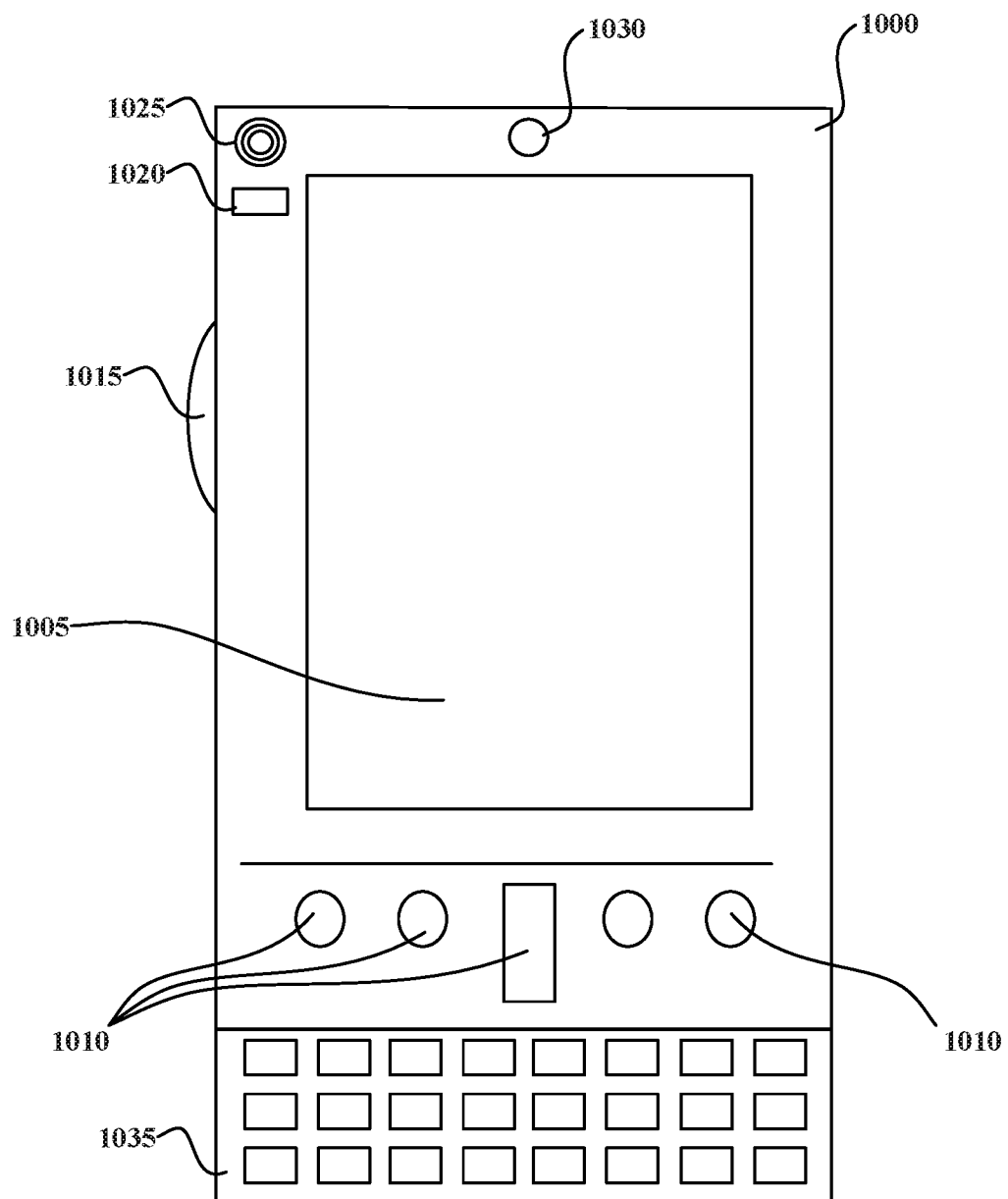
FIGS. 10 and 11 are simplified diagrams of a mobile computing device with which aspects of the disclosure may be practiced.
Figure 11:
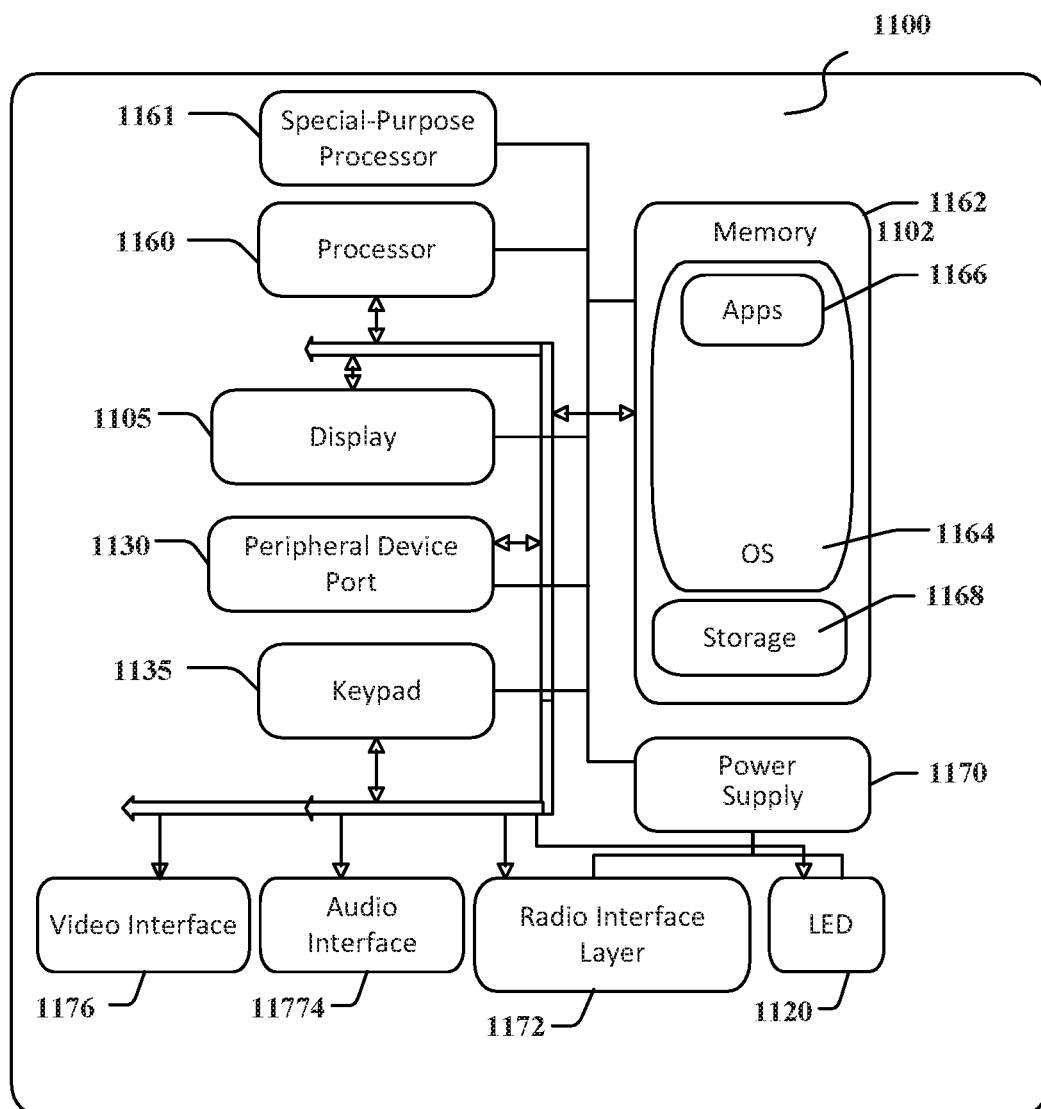

FIGS. 10 and 11 illustrate a mobile computing device 1000, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 10, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or fewer input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 11 is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including instructions for providing and operating a digital assistant computing platform.

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 702 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1020 may be used to provide visual notifications, and/or an audio interface 1174 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1025, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of an on-board camera 1030 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11 by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
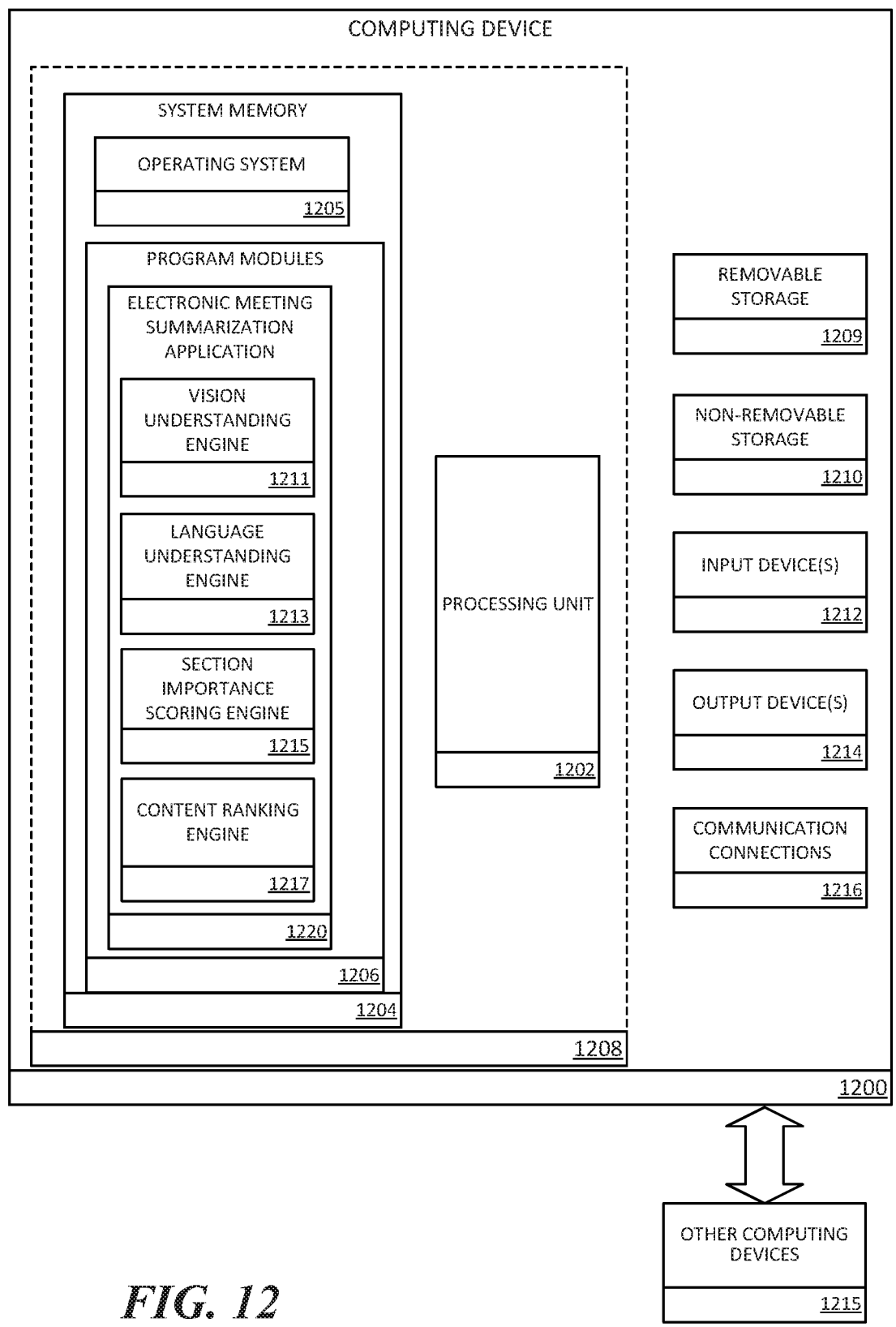
FIG. 12 is a block diagram illustrating example physical components of a computing device with which aspects of the disclosure may be practiced.

FIG. 12 is a block diagram illustrating physical components (e.g., hardware) of a computing device 1200 with which aspects of the disclosure may be practiced. The computing device components described below may have computer executable instructions for identifying important sections of, and content mentioned in, electronic meetings, and generating electronic meeting summaries. In a basic configuration, the computing device 1200 may include at least one processing unit 1202 and a system memory 1204. Depending on the configuration and type of computing device, the system memory 1204 may comprise, but is not limited to, volatile storage (e.g., random access memory), non-volatile storage (e.g., read-only memory), flash memory, or any combination of such memories. The system memory 1204 may include an operating system 1205 suitable for running one or more electronic calendar applications and productivity applications. The operating system 1205, for example, may be suitable for controlling the operation of the computing device 1200. Furthermore, embodiments of the disclosure may be practiced in conjunction with a graphics library, other operating systems, or any other application program and is not limited to any particular application or system. This basic configuration is illustrated in FIG. 12 by those components within a dashed line 1208. The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by a removable storage device 1209 and a non-removable storage device 1210.

As stated above, a number of program modules and data files may be stored in the system memory 1204. While executing on the processing unit 1202, the program modules 1206 (e.g., electronic meeting summarization application 1220) may perform processes including, but not limited to, the aspects, as described herein. For example, vision understanding engine 1211 may perform one or more operations associated with processing video data from an electronic meeting with a machine learning model that has been trained to classify facial features and user mannerisms to classify user images into one or more categories (e.g., interested, not interested, agree, disagree). Language understanding engine 1213 may perform one or more operations associated with processing text data from an electronic meeting with a machine learning model that has been trained to identify key points, documents, and/or tasks that are assigned to meeting participants. Section importance scoring engine 1215 may perform one or more operations associated with determining a combined importance score based on textual importance scores and visual importance scores for electronic meeting sections. Content ranking engine 1217 may perform one or more operations associated with arranging content in an electronic meeting summary based on combined importance scores.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1200 may also have one or more input device(s) 1212 such as a keyboard, a mouse, a pen, a sound or voice input device, a touch or swipe input device, etc. The output device(s) 1214 such as a display, speakers, a printer, etc. may also be included. The aforementioned devices are examples and others may be used. The computing device 1200 may include one or more communication connections 1216 allowing communications with other computing devices 1250. Examples of suitable communication connections 1216 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1204, the removable storage device 1209, and the non-removable storage device 1210 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200. Computer storage media does not include a carrier wave or other propagated or modulated data signal. Similarly, computer storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 13:
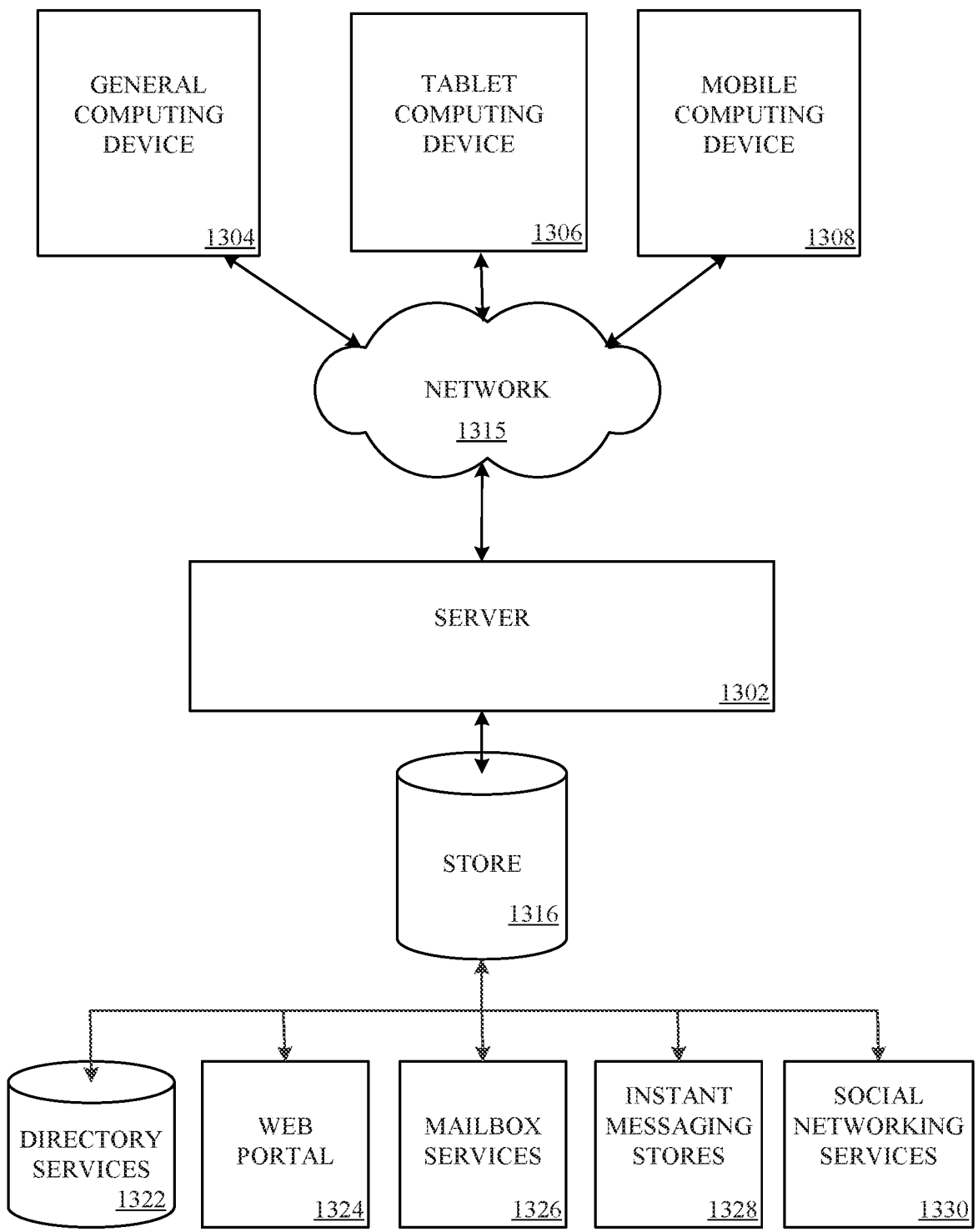
FIG. 13 is a simplified block diagram of a distributed computing system in which aspects of the present disclosure may be practiced.

FIG. 13 illustrates one aspect of the architecture of a system for processing data received at a computing system from a remote source, such as a personal/general computer 1304, tablet computing device 1306, or mobile computing device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking site 1330. The program modules 1206 may be employed by a client that communicates with server device 1302, and/or the program modules 1206 may be employed by server device 1302. The server device 1302 may provide data to and from a client computing device such as a personal/general computer 1304, a tablet computing device 1306 and/or a mobile computing device 1308 (e.g., a smart phone) through a network 1315. By way of example, the computer systems described herein may be embodied in a personal/general computer 1304, a tablet computing device 1306 and/or a mobile computing device 1308 (e.g., a smart phone). Any of these embodiments of the computing devices may obtain content from the store 1316, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for generating summary content from electronic meetings, the computer-implemented method comprising:
   receiving electronic meeting data comprising:
      voice audio data from a plurality of users, and
      video data of the plurality of users,
   applying a language machine learning model to a transcript of the voice audio data;
   determining, based on application of the language machine learning model to the transcript, a first textual importance score for a first section of the transcript corresponding to a first section of the electronic meeting data;
   applying a vision understanding machine learning model to the video data;
   determining, based on application of the vision understanding machine learning model to the video data, a first visual importance score for a first section of the video data corresponding to the first section of the electronic meeting data;
   determining, based on the first textual importance score and the first visual importance score, a first combined importance score for the first section of the electronic meeting data, wherein the first combined importance score is above a threshold value; and
   generating summary content of the electronic meeting data, the summary content comprising and indication of an importance of the first section of the electronic meeting data.

2. The computer-implemented method of claim 1, further comprising:
   sending an electronic message comprising the summary content to one of the plurality of users.

3. The computer-implemented method of claim 2, further comprising:
   applying a task identification language model to the transcript of the voice audio data; and identifying, based on application of the task identification language model, a task that was assigned to one of the plurality of users;

and wherein the summary content further comprises an indication that the task was assigned to one of the plurality of users.

4. The computer-implemented method of claim 1, further comprising:

identifying, from the electronic meeting data, a reference to an electronic document;

and wherein the summary content further comprises an identity of the electronic document.

5. The computer-implemented method of claim 1, wherein the summary content of the electronic meeting data comprises a video.

6. The computer-implemented method of claim 1, further comprising:

identifying a user account corresponding to a user that spoke in the first section of the electronic meeting data;

identifying a hierarchical organization level of the first user account; and determining, based on the hierarchical organization level of the first user account, a hierarchical score for the first section of the electronic meeting data.

7. The computer-implemented method of claim 6, wherein determining the first combined importance score for the first section of the electronic meeting data is further based on the hierarchical score determined for the first section of the electronic meeting data.

8. The computer-implemented method of claim 6, wherein identifying the user account corresponding to the user that spoke in the first section of the electronic meeting data comprises at least one of:

applying a neural network that has been trained to identify users based on facial image data to the video data;

analyzing account information for a computing device from which the user account joined an electronic meeting corresponding to the electronic meeting data; and applying a neural network that has been trained to identify users based on voice data to the voice audio data.

9. The computer-implemented method of claim 1, wherein applying the vision understanding machine learning model to the video data comprises:

applying the vision understanding machine learning model to first video data, of the video data of the plurality of users, received from a first computing device associated with a first one of the plurality of users; and applying the vision understanding machine learning model to second video data, of the video data of the plurality of users, received from a second computing device associated with a second one of the plurality of users.

10. The computer-implemented method of claim 9, further comprising:

determining, based on application of the vision understanding machine learning model to the first video data received from the first computing device, a first sub-visual importance score for the first one of the plurality of users and the first section of the video data; and determining, based on application of the vision understanding machine learning model to the second video data received from the second computing device, a second sub-visual importance score for the second one of the plurality of users and the first section of the video data.

11. The computer-implemented method of claim 10, further comprising:

determining a first emotion state image baseline for the first one of the plurality of users;

modifying the first sub-visual importance score based on the first emotion state image baseline;

determining a second emotion state image baseline for the second one of the plurality of users; and modifying the second sub-visual importance score based on the second emotion state image baseline.

12. The computer-implemented method of claim 1, wherein generating the transcript of the voice audio data comprises applying a speech-to-text machine learning model to the voice audio data.

13. The computer-implemented method of claim 1, further comprising:

determining that a threshold value of the plurality of users are associated with a first organizational group type; and selecting the language machine learning model for processing the transcript of the voice audio data from a plurality language machine learning models, wherein:

each of the plurality of language machine learning models has been trained to determine textual importance scores for a different organizational group type, and the language machine learning model has been trained to determine textual importance scores for the first group type.

14. A system for generating summary content from electronic meetings, comprising:

a memory for storing executable program code; and a processor, functionally coupled to the memory, the processor being responsive to computer-executable instructions contained in the program code and operative to:

receive electronic meeting data comprising:
voice audio data from a plurality of users, and
video data of the plurality of users, apply a language machine learning model to a transcript of the voice audio data;

determine, based on application of the language machine learning model to the transcript, a first textual importance score for a first section of the transcript corresponding to a first section of the electronic meeting data;

apply a vision understanding machine learning model to the video data;

determine, based on application of the vision understanding machine learning model to the video data, a first visual importance score for a first section of the video data corresponding to the first section of the electronic meeting data;

determine, based on the first textual importance score and the first visual importance score, a first combined importance score for the first section of the electronic meeting data, wherein the first combined importance score is above a threshold value; and generate summary content of the electronic meeting data, the summary content comprising an indication of an importance of the first section of the electronic meeting data.

15. The system of claim 14, wherein the processor is further responsive to the computer-executable instructions contained in the program code and operative to:

identify a user account corresponding to a user that spoke in the first section of the electronic meeting data;

identify a hierarchical organization level of the first user account; and determine, based on the hierarchical organization level of the first user account, a hierarchical score for the first section of the electronic meeting data.

16. The system of claim 15, wherein the processor is further responsive to the computer-executable instructions contained in the program code and operative to:

determine the first combined importance score for the first section of the electronic meeting data based on the hierarchical score determined for the first section of the electronic meeting data.

17. The system of claim 14, wherein in applying the vision understanding machine learning model to the video data, the processor is further responsive to the computer-executable instructions contained in the program code and operative to:

apply the vision understanding machine learning model to first video data, of the video data of the plurality of users, received from a first computing device associated with a first one of the plurality of users; and apply the vision understanding machine learning model to second video data, of the video data of the plurality of users, received from a second computing device associated with a second one of the plurality of users.

18. The system of claim 17, wherein the processor is further responsive to the computer-executable instructions contained in the program code and operative to:

determine, based on application of the vision understanding machine learning model to the first video data received from the first computing device, a first sub-visual importance score for the first one of the plurality of users and the first section of the video data; and determine, based on application of the vision understanding machine learning model to the second video data received from the second computing device, a second sub-visual importance score for the second one of the plurality of users and the first section of the video data.

19. The system of claim 18, wherein the processor is further responsive to the computer-executable instructions contained in the program code and operative to:

determine a first emotion state image baseline for the first one of the plurality of users;

modify the first sub-visual importance score based on the first emotion state image baseline;

determine a second emotion state baseline for the second one of the plurality of users; and modify the second sub-visual importance score based on the second emotion state image baseline.

20. A computer-readable storage device comprising executable instructions that, when executed by a processor, assists with generating summary content from electronic meetings, the computer-readable storage device including instructions executable by the processor for:

receiving electronic meeting data comprising:
  voice audio data from a plurality of users, and
  video data of the plurality of users, applying a language machine learning model to a transcript of the voice audio data;

determining, based on application of the language machine learning model to the transcript, a first textual importance score for a first section of the transcript corresponding to a first section of the electronic meeting data;

applying a vision understanding machine learning model to the video data;

determining, based on application of the vision understanding machine learning model to the video data, a first visual importance score for a first section of the video data corresponding to the first section of the electronic meeting data;

determining, based on the first textual importance score and the first visual importance score, a first combined importance score for the first section of the electronic meeting data, wherein the first combined importance score is above a threshold value; and generating summary content of the electronic meeting data, the summary content comprising and indication of an importance of the first section of the electronic meeting data.

* * * * *